March 24, 1970 H. N. K. PATON 3,502,240
MEMBRANE EDGE-ATTACHING STRUCTURE
Filed Oct. 30, 1967 4 Sheets-Sheet 1
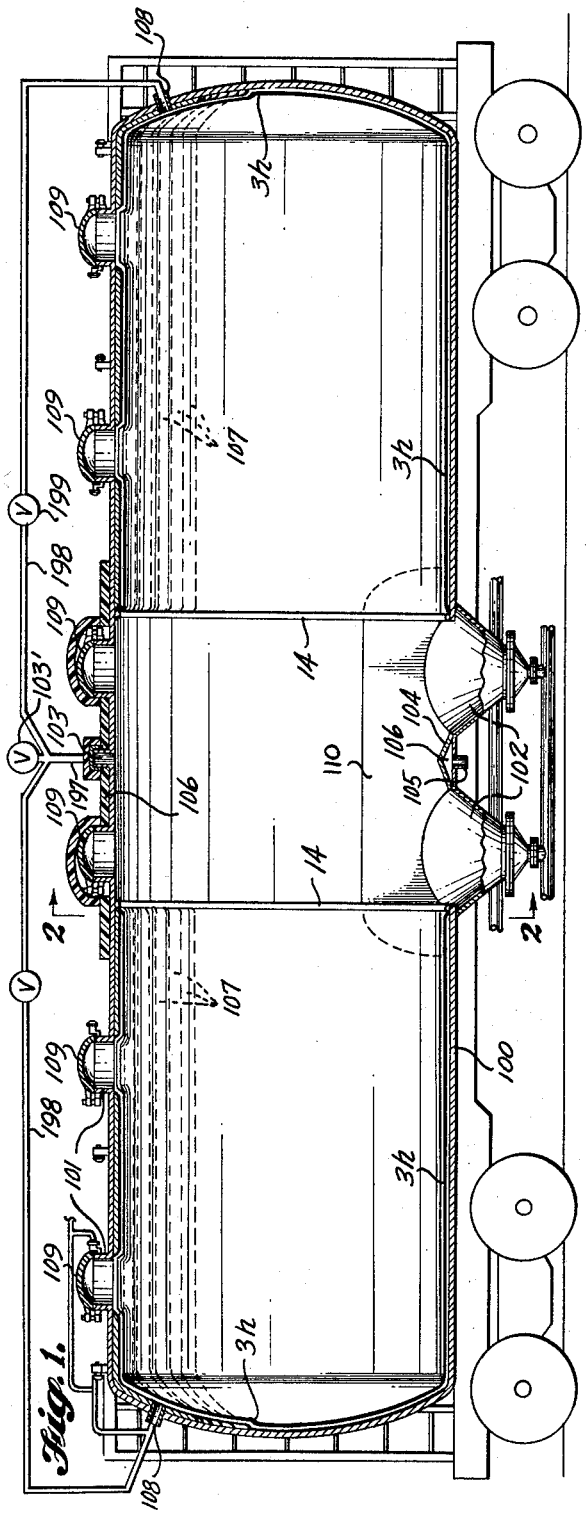
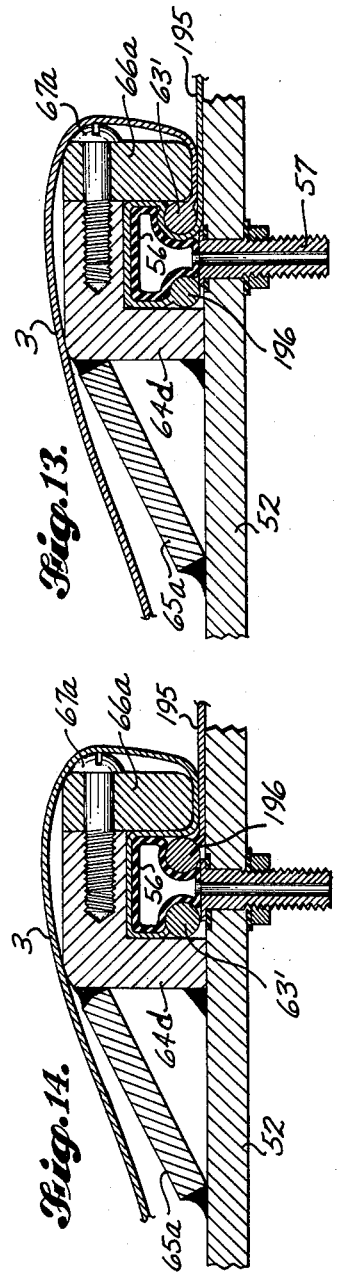
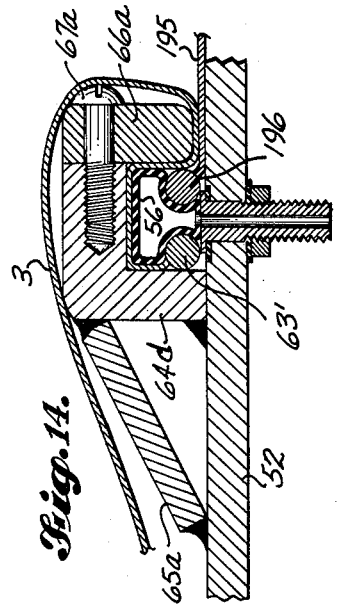
INVENTOR.
HAMILTON NEIL KING PATON
BY
Robert W. Beach
ATTORNEY March 24, 1970 H. N. K. PATON 3,502,240
MEMBRANE EDGE-ATTACHING STRUCTURE
Filed Oct. 30, 1967 4 Sheets-Sheet 2
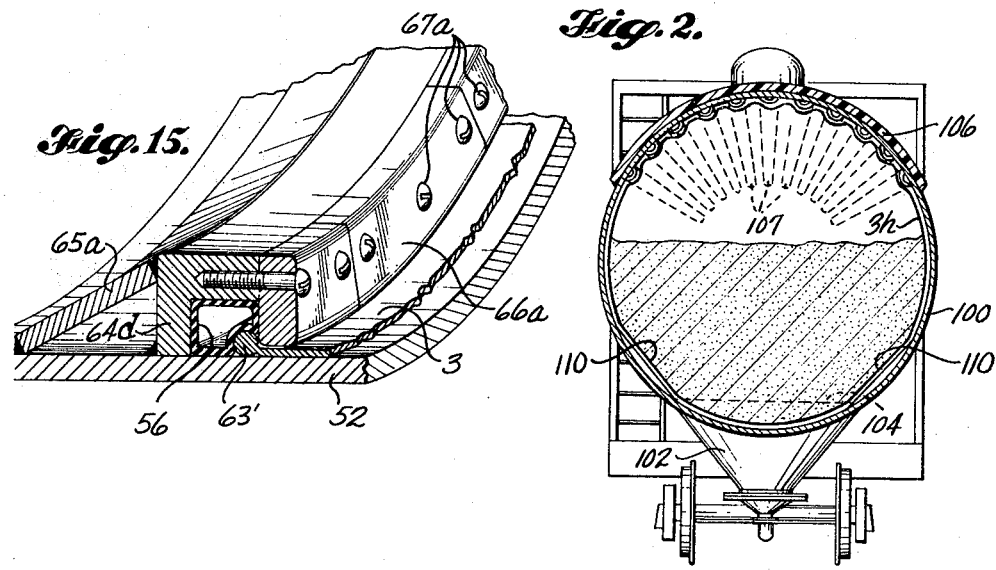
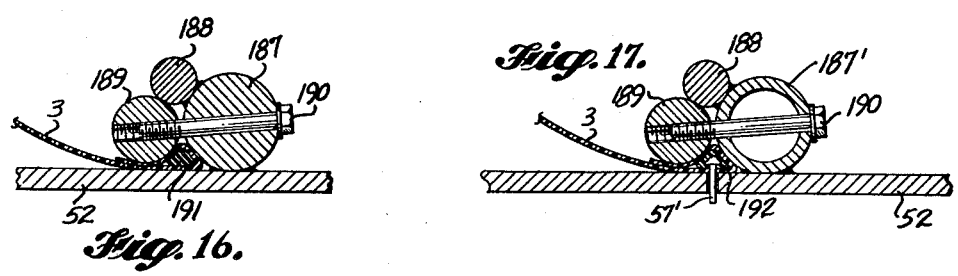
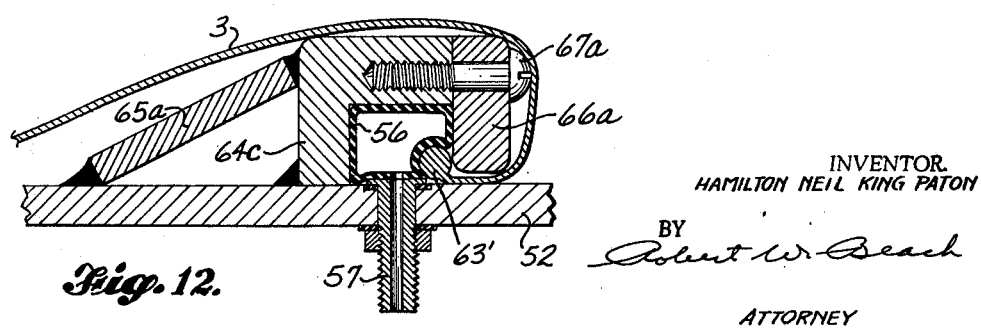
INVENTOR.
HAMILTON NEIL KING PATON
BY
Robert W Beach
ATTORNEY

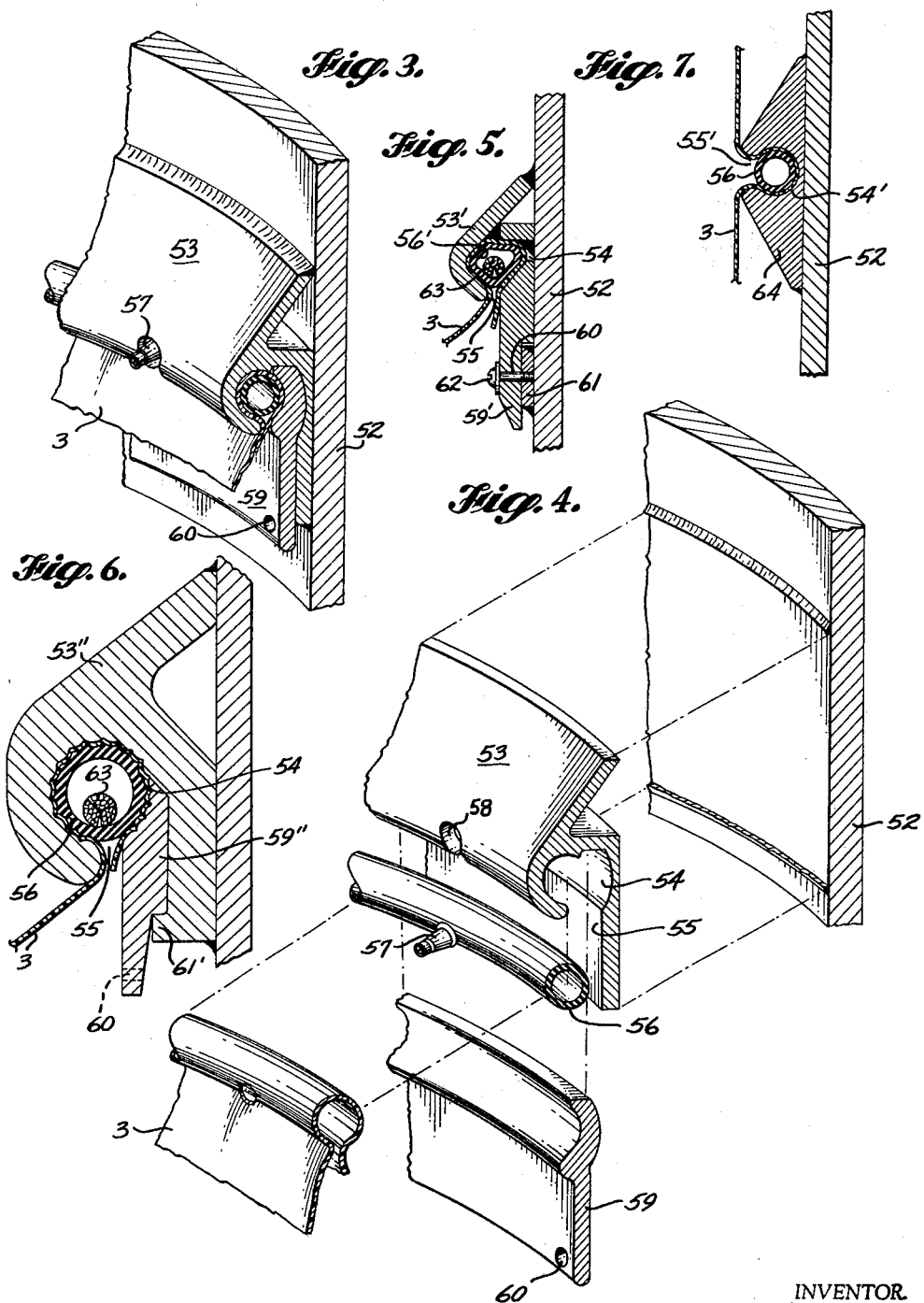

March 24, 1970   H. N. K. PATON   3,502,240
MEMBRANE EDGE-ATTACHING STRUCTURE
Filed Oct. 30, 1967   4 Sheets-Sheet 4

INVENTOR.
HAMILTON NEIL KING PATON
BY
Robert W. Beach
ATTORNEY

United States Patent Office 3,502,240
Patented Mar. 24, 1970

3,502,240
MEMBRANE EDGE-ATTACHING STRUCTURE
Hamilton Neil King Paton, Bellevue, Wash., assignor to Dynabulk Corporation, Bellevue, Wash., a corporation of Washington
Continuation-in-part of applications Ser. No. 307,447, Sept. 9, 1963, and Ser. No. 408,467, Oct. 30, 1964. This application Oct. 30, 1967, Ser. No. 679,082
Int. Cl. B65d 25/00
U.S. Cl. 220—22
2 Claims

ABSTRACT OF THE DISCLOSURE

Edges of membranes such as used for lining containers are attached and sealed to a container wall by confining a membrane margin in an attaching structure recess. The membrane margin is enlarged either by having on it a marginal bead or by being tubular or by being wrapped around a tube and such enlargement is confined in the attaching structure recess either by the margin being inflated in position or by an inflatable securing member being expanded into contact with a marginal bead of the membrane. Confinement of an inflatable membrane margin in the attaching structure recess can be assured in case of deflection by providing a filler member in the inflatable margin. The attaching structure recess can be formed by restricting the entrance to a channel by application to it of a removable retainer which may be a bar or an angle or a rod. The inflatable membrane margin or inflatable securing member can be inflated after the retainer has been secured in position constricting the channel opening.

---

This application is a continuation-in-part of my earlier patent applications Ser. No. 307,447, filed Sept. 9, 1963, for Methods of Densifying and Deterring Deterioration and Contamination of Discrete Particle Material in a Container now Patent No. 3,396,762, and Ser. No. 408,467, filed Oct. 30, 1964, for Internal Membrane Mechanism and Method for Unloading Material from Containers, now Patent No. 3,351,235. This invention is particularly concerned with apparatus including a membrane that can be moved between a position in lining relationship to a container wall and a position spaced from such container wall for the purpose of unloading material from the container and particularly material composed of particles which may be very small, such as in cement or flour, or comparatively large, such as in grain or pellets. Such a membrane can also be used for unloading a sludge or slurry which would not drain completely from a container without assistance.

By providing a pressure differential on opposite sides of the membrane such that the pressure is higher in the space between the membrane and the outer wall of the container, the membrane can be pressed against discrete particle material in the container for the purpose of packing particles together to increase the density of the material and the membrane can also be manipulated to assist in discharging material from the container by pressure of the membrane on such material. In order for the membrane to be pressed effectively against the material, either for the purpose of compacting it or for discharging it, it is a principal object of the invention not only to hold the margin of the membrane securely in opposition to pressure exerted on the membrane, but also to effect a seal between the membrane margin and the container so that a desired pressure differential can be maintained readily on opposite sides of the membrane. Such pressure differential can be effected either by reducing the pressure in the material-receiving space within the container below atmospheric pressure or by increasing the pressure between the membrane and the container wall to a pressure above atmospheric pressure or both.

Another object is to provide a membrane installation in a container having walls capable of withstanding internal pressure in excess of atmospheric pressure so as to enable the pressure between the container wall and the membrane to be increased above atmospheric. It is a particular object to provide membrane edge-attaching structure which can be utilized effectively to attach the margin of a membrane to such a curved container wall. The margin of such a membrane can, however, be attached to a container wall in an upright plane or in a horizontal plane or along a line which is not in a plane.

FIGURE 1 is a longitudinal section through a railway tank car representing a container having a lining membrane and FIGURE 2 is a transverse section through such railway car taken on line 2—2 of FIGURE 1 showing the container partially loaded.

FIGURE 3 is a top perspective of a fragment of anchoring mechanism for securing the edge portion of a membrane to a rigid wall for use in a membrane installation such as shown in the above figures. FIGURE 4 is an exploded top perspective of the anchor mechanism shown in FIGURE 3.

FIGURES 5 to 10 are transverse sections through different alternative types of membrane edge-securing structure.

FIGURES 12, 13 and 14 are transverse sections through another type of membrane margin-securing structure showing different arrangements for securing membrane margins thereby and FIGURE 15 is a fragmentary top perspective of such structure showing the membrane-securing arrangement of FIGURE 12.

FIGURES 16 and 17 are transverse sections through different alternative types of membrane margin-securing structures.

Figure 8:
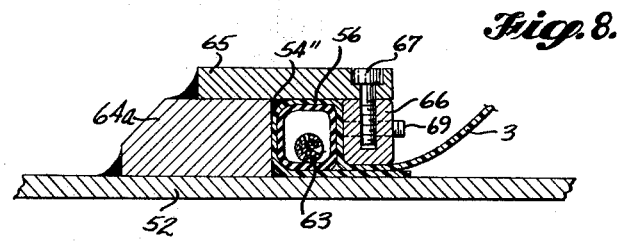

A representative membrane installation in a container is shown in FIGURES 1 and 2, which has three principal functions. The first function is that of constituting a vapor barrier and insulation element in a container. The second function is as a dynamic element for compacting or densifying material composed of fine discrete particles to increase the weight of material which can be accommodated in a given container and for breaking up agglomerated material. The third function of the membrane installation is to facilitate unloading of discrete particle material or sludges or slurries from a container by exerting controlled pressure on the material for moving it while, at the same time, if desired, protecting the container in which the membrane is installed from being subjected to an internal pressure below atmospheric pressure. This principle can be utilized whether the container is a stationary storage container or a transportation container, such as a tank truck or tank trailer, a railway tank car or a marine vessel.

The membrane installation of the present invention is especially concerned with containers for storing or transporting discrete particle material, which term is intended to embrace any material having reasonable flow characteristics including fine powdered material, such as flour or cement; granular material such as sugar, salt or sand; coarse particle material such as whole grain or corn kernels; chunky material such as pellets, pulp chips, briquets and crushed limestone and small objects such as corn cobs, fruit and vegetables, such as oranges and potatoes, and other materials of irregular shape, as long as particles of the mass are or can be made discrete. All of such products are included within the term discrete particle material because all of them have the characteristics of not being liquid, their particles not adhering into a mass and of forming a reasonably steep angle of repose when piled. It should be understood that the specific items mentioned are only intended as examples to illustrate material having the characteristics pertinent to utilization of the present invention.

A principal application for the present invention is in rail cars, which may take the form of either a tank car, shown in FIGURES 1 and 2, or a boxcar. The membrane should be of relatively strong and tough very flexible sheet material, which preferably is dimensionally stable. Such material may be a fabric rendered air impermeable and waterproof, such as urethane-coated Dacron fabric, or the membrane can be of nonwoven material such as polyester resin sheet, available under the trade name Mylar. Such membrane materials are to be understood as merely representative. When such a membrane is interposed between discrete particle material in the container or tank and the tank shell there will be only a very small air space around the liner when the container is loaded. Such air can carry only a small amount of moisture. The membrane barrier prevents the ascension of moisture from the material received in the container into contact with the upper portion of the container wall.

In FIGURES 1 and 2 the container or tank 100 could be used as a stationary in-plant storage container, or a land transportation container such as a tank car, tank truck, a semitrailer tank, a trailer tank or a boxcar. As shown in FIGURE 1, the tank 100 has a plurality of loading ports 101 located at spaced intervals along its top. The material is unloaded from the tank through discharge hoppers 102, of which there are preferably two, located in the central portion of the tank between the membrane attachment lines 14. A vent opening 103 is located in the top of the tank preferably at approximately the center.

In the particular tank shown in FIGURE 1 six loading ports are shown, two of which are located between the membrane attachment lines 14, two more of such ports at the top of that portion of the tank which can be lined by one membrane 3h in one end portion of the tank, and two other ports at the top of the other end portion of the tank which can be occupied by another membrane. The tank has no central partition. Material can be dislodged from the space between the hoppers 102 by a bridge 104 preferably inclined downward toward the two hoppers. Flow of material from such bridge into each of the hoppers can be expedited by supplying air under pressure through a connection 105 to the cavity 106 beneath the bridge and perforating the bridge so that air can escape through it to loosen particulate material above the bridge, and/or the bridge can be connected resiliently to the adjacent portions of the tank and provision made for vibrating the bridge to loosen material for flow from it into the hoppers.

At the central portion of the tank between the membrane attachment lines 14 a layer of insulation 106 can be provided extending over approximately the upper quadrant of the tank. It is not necessary for the insulation to extend farther down around the sides than this, because warm moist air, which produces internal condensation, rises from the material in the tank into the dead air space only above the load and in addition the material is in contact with the bottom and lower portions of the tank wall, thus acting to prevent condensation. In the end portions of the tank it may be desirable to provide insulation in the form of ribs 107 between the membranes proper and the tank wall proper to prevent condensation occurring inside the membranes, particularly if it should be necessary to interrupt such loading operation for a substantial period of time.

When it is desired to load the tank a suction source is connected to each of the pipes 108, which extends through the shell of the tank 100, to communicate with the space between the shell and a membrane 3h. Only a very small suction is required for this purpose, such as one-half a pound per square inch, or even less. At the same time the vent 103 is open to supply air under atmospheric pressure to the interiors of the membranes. Such atmospheric pressure exerted on the membrane interiors will press the membranes away from their attachment lines 14 into the tank wall-lining relationship shown in FIGURE 1. Alternatively, the connections 108 can simply be vented and a source of air under a small pressure can be connected to the pipe 103 to provide a differential in pressure on opposite sides of the membranes. This latter method of providing a pressure differential on opposite sides of the membranes is, however, less desirable during the tank loading operation.

While the membranes are being held in the wall-lining positions shown in FIGURE 1, particulate material can be loaded into the space within the membranes through one or more of the loading ports 101. When the loading has been completed the covers 109 are closed and secured, but the interior of the tank may continue to be vented through the vent opening 103, or such opening can be closed after suction has been applied to draw the membrane down into close contact with the stored material, as discussed previously. The material is then thus stored or transported until it is ready to be discharged from the tank.

FIGURES 3 to 17 show various types of joints by which membrane elements can be secured to the inner wall of a tank or container. A common characteristic of the joint shown in FIGURES 1 to 11, 16 and 17 is that the edge portion of the membrane is wrapped around a marginal tube which is confined in a groove or channel and is inflated with fluid under pressure, both to secure the edge portion of the membrane and to seal such edge portion in fluidtight relationship to the container wall. Also, each of the constructions shown in FIGURES 3 to 17 includes a removable retainer which constricts the channel opening or obstructs the opening to the groove or recess in which the inflatable member is received. When such retainer is removed access to the channel enables the inflatable tube to be inserted into the channel. In most instances the tube is inflated after being inserted into the channel, although, in some instances, it could be inflated before being inserted. When the retainer is in place, opening into the channel is reduced to a narrow slit through which the edge portion of a membrane can extend but which will prevent escape of a marginal tube or cord of the membrane.

In FIGURE 3 the container wall 52 has welded to it a joint strip 53 of special profile which is shown separately in the exploded view of FIGURE 4. The profile of this strip provides the groove 54 of special cross-sectional contour shown as being undercut at opposite sides to leave a slot 55 considerably narrower than the maximum width of the groove. Such strip 53 is curved longitudinally if it is to be applied to a curved tank wall. Preferably the groove 54 is located approximately midway between opposite edges of the strip and such opposite strip edges are secured by welding to the container wall 52 if both the strip and such wall are metal.

As has been mentioned above, for some purposes it may be desirable for the container walls to be flexible, such as being of fabric reinforced rubber material. In that event the edge portion of the membrane 3 can be reinforced, membrane edge can then be vulcanized or otherwise suitably bonded directly to the flexible container wall made of rubber or plastic material. The specific marginal structures for the membrane 3 shown in FIGURES 3 to 11 are all of the rigid type intended to be used with rigid-walled containers.

In the membrane-to-container wall joints shown in FIGURES 3 to 6 the membrane edge retaining grooves all open in a direction parallel to the container wall. The groove entrance slot 55 in each instance is of a width great enough to receive tubing 56 into the slot by movement of such tubing transversely of its length. The contour of the side of the groove remote from the wall 52 preferably is generally complemental to the shape of the tubing. For purposes of inflation the tubing 56 in FIG- URES 3 and 4 is shown as having a valve stem 57 which can be projected through an aperture 58 in the wall of the strip remote from the container wall 52. If desired, such aperture may be in the form of a deep notch in the strip flange forming one wall of the groove so that the valve stem can enter the aperture 58 by movement of the stem transversely of its length instead of by longitudinal movement.

From the relationship of the joint strip 53 and the marginal tubing 56 shown in FIGURE 4, the edge portion of the membrane 3 is wrapped around the tubing and then the tubing is moved transversely of its length through the slot 55 into the groove 54 to the relationship shown in FIGURE 3. If the tubing is then moved away from the wall 52 to seat in the groove a space will be left in such groove between the tubing and the wall of the groove adjacent to the container wall 52. Moreover, the side of the groove adjacent to the container wall is undercut, as shown in FIGURE 4, behind an adjacent portion of the strip wall. Into the space between such undercut portion of the groove and the tubing 56 an edge of a retainer 59 can be inserted through the groove entrance slot 55 from the position of FIGURE 4 to that of FIGURE 3.

It will be noted that in the structure of the strip 53, shown in FIGURES 3 and 4, the undercut portion of the groove 54 adjacent to the container wall 52 is of concave shape. The edge of the retainer 59 insertable into the groove 54 is of complemental convex shape on one side and the opposite side is concave, preferably of a curvature generally corresponding to the curvature of the adjacent side of the tubing 56. When the edge of retainer 59 has thus been inserted into the strip groove 54, therefore, the tubing 56 will be embraced rather closely between the wall of the groove 54 remote from the container wall 52 and the inserted edge portion of the retainer 59. Moreover, such retainer will have restricted the passage through the groove entrance slot 55 sufficiently to prevent escape of the tubing 56 from the groove, although the remainder of the slot is sufficiently wide to enable the two thicknesses of the membrane 3 to pass easily through it when the retainer edge portion is in the groove.

Also, it is preferred that the edge portion of the retainer 59 be inserted into the groove 54 by a combined edgewise advancing and swinging movement so that when the retainer has been moved into the position shown in FIGURE 3 the retainer cannot drop out of the groove, even if the groove entrance slot 55 opens downwardly, as shown in FIGURES 3 and 4. In fact, the retainer could not even be pulled directly downward because of the fit of its convex protuberance in the undercut portion of the grove. To facilitate removal of the retainer, therefore, an aperture 60 is provided in the retainer strip at a location spaced from its edge inserted in the groove 54 to enable a pointed tool to be engaged in the aperture 60 for swinging the retainer strip relative to the container wall 52 so that this retainer strip edge portion can be withdrawn from the groove 54.

In FIGURES 5 and 6 the joint strips 53′ and 53″, respectively, are generally similar to the joint strip 53, shown in FIGURES 3 and 4, except that the strip 53 would be cast in increments of convenient length and the strip 53′ is fabricated from metal strips. Also, while the strip 53″ of FIGURE 6 is of cast construction its cross-sectional shape is somewhat different from that of the strip 53. In each of the joint structures shown in FIGURES 5 and 6 the undercut portion of the groove 54 is formed by a projecting ledge. In FIGURE 5 the ledge is formed by a flat strip 61 welded to the container wall 52, and in the construction of FIGURE 6 the ledge is formed by a projection 61′ cast integral with the strip 53″.

While the retainers 59 of FIGURES 3 and 4, 59′ of FIGURE 5 and 59″ of FIGURE 6 are of different cross-sectional shapes best suited in each case to the particular joint strip structures, all of such retainers function in the same manner and can be of the same length of sections. In each instance the sections should be quite short where there is curvature of the wall 52. The retainers 59′ of FIGURE 5 and 59″ of FIGURE 6 have shoulders engageable with the ledges formed by strip 61 of FIGURE 5 and projection 61′ of FIGURE 6 to support the retainers positively. In addition, the retainer 59′ of FIGURE 5 can be secured in place by a bolt 62 extending through a hole 60 in the retainer and threaded into the ledge-forming strip 61. The retainer 59′ of FIGURE 6 also has in it a hole 60 in which a tool can be engaged to swing the retainer for disengaging its shoulder from the ledge of the strip formed by the projection 61′.

The shapes of the grooves formed cooperatively by the joint strips and the retainers in FIGURES 3, 5 and 6 in which the marginal tubing 56 is confined differ somewhat in shape. In FIGURE 3 the resultant groove is of substantially circular cross section. The groove formed by the structure shown in FIGURE 6 also is of substantially circular cross section, except that the walls of the strip cavity 53″ and retainer 59″ are scalloped lengthwise to provide an irregular surface engageable by the tubing-backed membrane 3 to afford a more positive grip on the edge portion of the membrane. In the fabricated joint structure of FIGURE 5 the groove formed cooperatively between the fabricated strip 53′ and the retainer 59′ is of irregular angular shape. The tubing 56′ is sufficiently flexible, however, so that when it is wedged into the groove by insertion of the retainer 59′ it will be deformed in cross section to correspond generally to the shape of the groove.

When the tubing 56 is inflated by air under pressure supplied through the connection 57 the tubing will stretch somewhat and become much more rigid, so as to avoid any possibility of the tubing being pulled from the joint by pulling membrane 3. Moreover, inflation of the tubing in each instance will cause it to expand into the groove and clamp the edge portion of the membrane 3 tightly between the tubing and the joint strip. In order to eliminate all possibility of the tubing being pulled from the groove in the event that it should become punctured or deflected for any other reason, a rope 63, shown in FIGURES 5 and 6, can be inserted through the hollow interior of the tubing 56 so as to limit the extent to which the tubing can be contracted in cross section without interfering with the inflatability of the tube. Such rope preferably is much smaller than the tube hollows.

A simplified type of membrane joint and anchoring strip structure is shown in FIGURE 7. In this instance the strip 64 is of unitary character, being of generally isosceles triangular shape in cross section and having its base angles secured by welding to the container wall 52. A slot 55′ is provided along the apex of the strip which opens into the groove 54′ formed centrally in the strip. The maximum width of such groove is considerably greater than the minimum width of the access slot 55′. Also, the width of the slot 55′ will, of course, be less than the diameter of the cylindrical tubing 56 so that it will be necessary to squeeze the tubing in order to insert it through the slot into the groove 54′, in the manner shown in FIGURE 6. Because of the undercut character of the opposite groove walls, the inherent resilience of the tubing will tend to prevent it from being pulled through the slot 55′ by pulling on the membrane 3. When the tubing is inflated, however, the resistance to its withdrawal from the groove 54′ by such a pull will be increased greatly.

Figure 9:
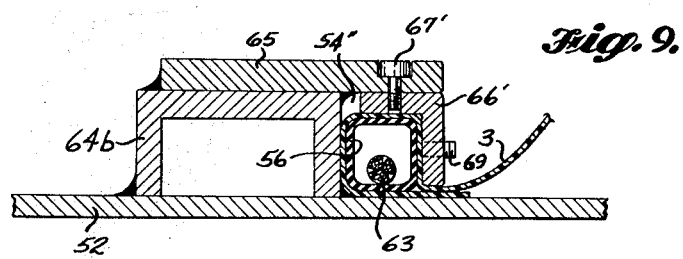
Figure 10:
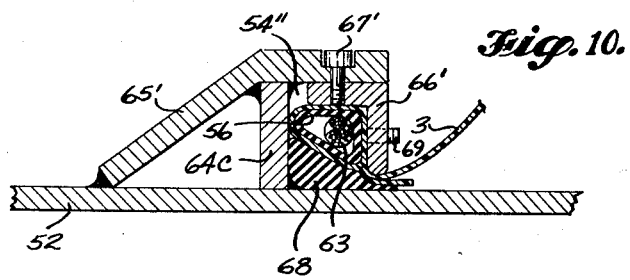

In FIGURES 8 to 11, inclusive, a somewhat different type of fabricated membrane anchoring and sealing joint is illustrated. In each instance the tubing-receiving groove is of generally rectangular cross-sectional shape and the access slot to such groove is at least as wide as the maximum width of the groove. Such access slot is, however, in each instance blocked by a removable groove-obstructing member which almost completely closes the entrance to the groove receiving the tubing 56 and the edge portion of the membrane 3 wrapped around it. The types of structure shown in FIGURES 8 to 10 are particularly well suited to the economical formation of a cavity for receiving and retaining marginal tubing of different sizes which it may be desirable to use.

In FIGURE 8 the joint includes a spacer bar 64a welded to the container wall 52 and a strip 65 welded to the bar 64a and having a portion overhanging the bar to form the groove 54″ receiving the tubing 56. The access opening to the groove is closed by a bar 66 of generally rectangular cross section, which is secured to the strip 65 by cap screws 67. The bar 66 is somewhat narrower than the thickness of bar 64a so as to provide a narrow opening between the container wall 52 and the edge of bar 66 adjacent to it for passage of the edge portion of membrane 3. The tubing 56 is thus confined between the bars 64a and 66. To insure that pulling force on the membrane 3 cannot move the tubing 56 between bar 66 and the container wall 52 a rope 63 of the type previously described in connection with FIGURE 6 can be threaded through the tubing to limit the extent to which such tubing can be squeezed in the event that it should be deflated for any reason.

The structure shown in FIGURE 9 is similar to that of FIGURE 8, except that in this instance the construction is particularly suited to the formation of a groove for reception of larger tubing 56. In this instance the strip 65 is spaced from the container wall 52 by the channel member 64b instead of by a solid bar such as the bar 64a of FIGURE 8. The edge flanges of channel 64b are welded to the container wall 52 and the strip 65 in turn is welded to the web of the channel in a position such that its edge portion projects beyond one flange of the channel to form the tubing-receiving groove 54″. This groove is closed by an angle member 66′ except for a narrow slot between one flange of the angle and the container wall 52 for passage of the edge portion of membrane 3. The flange of such angle member parallel to but remote from container wall 52, which is in face-to-face engagement with the overhanging portion of strip 65, is secured to such strip portion by cap screws 67′. In this instance, also, the tubing 56 may have a rope 63 threaded through it.

The tubing-receiving groove 54″ in FIGURE 10 is formed by a strip 64c disposed with its width extending perpendicular to the container side 52. The edge of this strip abutting the container wall is welded to it and its opposite edge is engaged with and welded to the underside of a strip 65′ bent to provide one end portion bridging between the container wall and the edge of strip 64c remote from such container wall, and its other edge portion overhanging the side of strip 64c remote from the edge portion of strip 65′ extending to the container wall 52. In this instance the angle 66′ mounted to obstruct the opening to the groove preferably has a flange portion disposed perpendicular to the container wall 52, which is spaced somewhat farther from such wall than the flange of the angle in FIGURE 9.

To insure that the tubing 56 cannot escape from the groove between the container wall 52 and the angle 66′ a yieldable rubber strip 68 of triangular cross section is inserted into the groove between the container wall 52 and the tubing 56 with a wider portion adjacent to the groove bottom and a narrower portion adjacent to angle 66′. Preferably a portion of the strip 68 actually extends between the angle flange and the container wall, and the thickness of such portion and the width of the angle flange are such that the edge portion of such flange presses the edge portion of the membrane 3 firmly against the strip 68 to deform it to some extent and secure such strip positively in the groove. The combination of the strip 68, the tubing 56 and the rope 63 threaded through the tubing thus guarantees that the edge portion of membrane 3 cannot escape from the groove 54″ and effects a continuous fluidtight seal.

Figure 11:
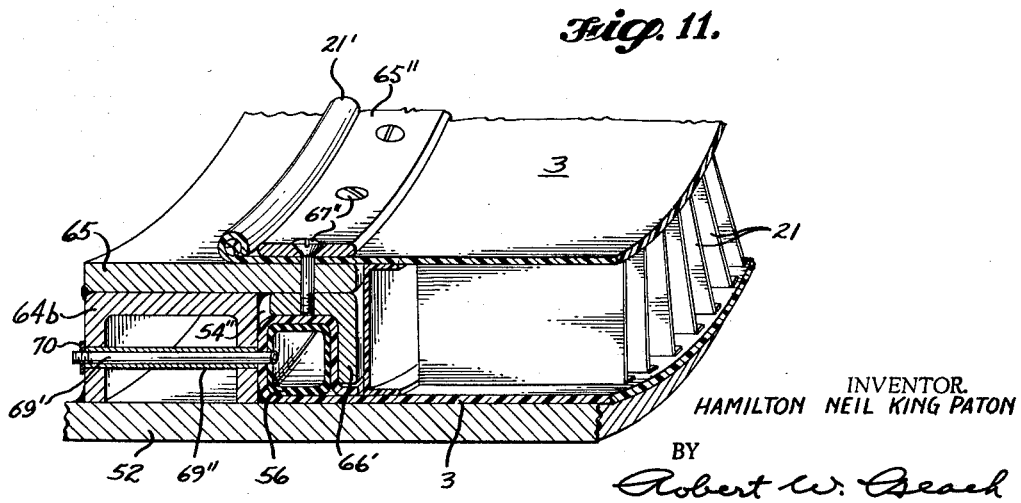
FIGURE 11 is a top perspective of a fragment of a double-engagement membrane margin-securing device.

The construction shown in FIGURE 11 would be particularly applicable for a membrane installation where the membrane has a double wall. The basic structure of this joint is similar to that shown in FIGURE 9 in that such joint includes a channel 64b, the flanges of which are welded to the container wall 52. An edge portion of strip 65 is welded to the web portion of channel 64b and the other edge portion of the strip projects beyond a flange of channel 64b to form the groove 54″. The tubing 56 with the edge portion of membrane 3 wrapped around it is held in the groove 54″ by the angle 66′, which is secured in place by a row of bolts 67″ projecting through a band 65″ overlying the strip 65. Such bolts extend through such strip and are threaded into the angle 66′. The edge of the membrane sheet forming the inner side of pockets 21 is clamped between the band 65″ and strip 65 to hold it in position. Also, such membrane may have a rolled edge 21′ at the side of the band opposite the pockets 21 further to deter escape of the membrane edge.

While, as has been pointed out above, the width of the groove in a structure such as shown in FIGURE 11 is wide enough to receive the tubing 56, even if it is inflated, it will be evident that placement of the retaining angle 66′ effects deformation of such tubing from a form of substantially circular cross section to a substantially square cross-sectional shape. If the tube were inflated prior to the operation of securing it in the groove it might be very difficult to deform the tube to the generally square shape necessary to enable the bolts 67″ to be inserted. Consequently, the tubing will usually be inflated after the angle 66′ has been secured in place.

In the joints shown in FIGURES 8, 9 and 10, a valve stem connected to the tubing can simply extend through the retainer and such valve stems are designated 69 in those figures. In the construction of FIGURE 11, however, the side of the retainer exposed in FIGURES 8, 9 and 10 is covered by the structure of pockets 2. In this instance, therefore, the valve stem 69′ extends from the tubing 56 through a tube 69″ passing through the opposite flanges of channel 69′. A nut 70 screwed onto the end of the valve stem will hold it in place. In each instance of FIGURES 8 to 11, therefore, the tubing 56 can be inflated after it has been secured in place in a manner shown in these figures by the joint structure.

Alternatively, if the tube 56 is expanded by supplying fluid pressure to its interior prior to its insertion into the joint retaining groove the provision of a valve stem would not necessarily be required. Fluid could be injected into the tube through a hypodermic type of hollow needle which could simply pierce the wall of the tube. After inflation of the tube the needle could be withdrawn and the material of the tube wall would expand to seal the puncture made by the needle automatically. Such inflation of the tube 56, whether performed prior or subsequent to insertion of the tube into the tube-retaining groove of the joint, could be either gas under pressure or liquid. If liquid is injected into the tube after it has been installed and confined in the tube-retaining groove of the joint, such liquid could be in the form of a suitable resin which would set in place within the tube to form a solid structure. If desired, such resin could be of the foaming type to exert internal pressure within the tube as it sets.

FIGURES 12, 13, 14 and 15 show a structure which can be fabricated from simple and conventional structural shapes with a minimum expense while being effective. In this instance, the main component of the membrane edge-attaching structure is the member 64d of angle cross section. One flange of such angle is secured by a fillet weld to the inner surface of the container wall 52. Such attached flange of the angle can be braced by a band 65a inclined from the container wall to the corner of the angle 64d. One edge of such band is then secured by a fillet weld to the container wall and the other edge is welded to the corner of the angle. This band serves both as a brace for the angle 64d and as a ramp to support the container-lining membrane 3 in overlying relationship generally as illustrated in FIGURES 12, 13 and 14.

The cavity beneath the flange of angle 64d, which is parallel to the container wall, forms a channel or groove for receiving a membrane edge portion and an inflatable tube 56 for securing the membrane edge portion in place. The opening to the groove can be closed by a retainer bar 66a removably secured to the flange of angle 64d spaced from the container wall by bolts 67a. The length of the bar 66a can be divided into short sections, as shown in FIGURE 15, to facilitate installation of the bar.

In FIGURE 12 the membrane attaching structure is used to anchor to a container wall the margin of only one membrane 3. The edge of such membrane has a bead 63' extending along such edge which can be received in the groove between the angle 64d and the retainer 66a. Such bead is clamped securely in this position and sealed against leakage of air past it by inflation of tube 56 inserted in the margin-receiving groove alongside the bead 63'. When such tube is inflated by air supplied to it through the valved stem 57, the tube cross section will be expanded to press against the bead and force it into contact with the surface of the container wall 52 and the surface of the bar 66a forming the angle in which the bead seats.

When the margin of a single membrane is anchored by the membrane-attaching structure shown in FIGURE 12, which has a bead 63' extending along its edge, only one thickness of membrane will pass between the container wall and the adjacent edge of the retainer bar 66a. It is possible, however, to anchor the margins of a plurality of membranes by use of such attaching structure. In FIGURES 13 and 14 the margins of two membranes are shown as being anchored by such structure in different representative arrangements. In FIGURE 13 the margin of membrane 3 and its marginal bed 63' are received in the groove formed by the angle member 64d and held in place by the inflated tube 56 in the same manner as shown and described in connection with FIGURE 12. In addition, however, the edge portion of a second membrane 195 extends between the container wall 52 and the edge of retainer bar 66a adjacent to it. The edge portion of this membrane extends into the groove beyond the edge bead 63' and, preferably, around the inside of the inflatable tube 56 so as to lodge the marginal bead 196 of this membrane in the angle between the inner surface of the container wall and the supporting flange of the angle 64d, as shown in FIGURE 13.

When the tube 56 is inflated by air supplied to it through the stem 57, such tube will press tightly against the edge portion of membrane 195 within the groove between the two beads 63' and 196 and will press such beads tightly into opposite angles of the groove in which the tube is received so as to hold the edge beads firmly in position and press them against adjacent surfaces sufficiently firmly to prevent leakage of discrete particle material or even of air past the securing structure.

In FIGURE 14 the same type of membrane edge-attaching structure is illustrated as against clamping the margins of two membranes, but such margins are arranged differently. In this instance the marginal bead 196 extending along the edge of membrane 195 is lodged in the angle between the inner surface of the container wall 52 and one side of the retainer bar 66a. The edge portion of the membrane 3 extends between the container wall and the adjacent edge of the retainer bar 66a and then past the bead 196 and around the inner side of the tubing 56 so that its marginal bed 63' is lodged in the angle between the inner surface of the container wall and the supporting flange of angle 64d. In other words, the margins of the membranes 3 and 195 in FIGURE 14 are simply interchanged from the relationship shown in FIGURE 13. Additional beaded membrane margins could be lodged in the groove of angle 64d, if desired, with their edge portions simply extending between the edge portions of the membranes 3 and 195, as shown in FIGURES 13 and 14, and their beads being located generally between the beads 63' and 196, as shown in FIGURES 13 and 14.

In order to install a membrane or membranes using the edge-attaching structure shown in FIGURES 12 to 15, it is necessary to remove the bolts 67a and withdraw the retainer bar 66a from the entrance to the groove. While the tube 56 is in deflated condition, the marginal bead or beads of a membrane or membranes are placed in the groove alongside the tube 56 and the retainer bar 66a is then replaced section-by-section. After the retainer bar has been secured by the bolts 67a, the tube 56 will be inflated to crowd the marginal beads firmly against a wall or walls of the groove, both to hold them in place and to effect a gastight seal along the edge of each membrane margin.

The membrane margin-attaching means shown in FIGURES 3 to 15 all include members of somewhat angular shape which it might be necessary to preform to the curvature of the wall 52 before they could be welded in place. FIGURES 16 and 17, on the contrary, illustrate membrane edge-attaching means which are composed of rods or tubes and which, therefore, can be bent readily to any curvature of reasonably large radius. Unless the radius of curvature is quite large, it would be desirable to assemble the components in place instead of assembling them prior to placement in the container. On the other hand, such components could be assembled in a jig corresponding to the curvature of the container wall. In either case, no special complicated forming operation is required.

In FIGURE 16, the principal component of the attaching means is the rod 187 which is welded to the container wall 52 along the desired line of membrane attachment. The smaller cylindrical rod 188 is then welded onto the larger rod 187 so as to provide a groove for receiving the edge portion of the membrane 3. This groove is closed by a wedging rod 189 which can be drawn into the groove entrance slot between the rod 188 and the wall 52 by bolts 190 extending through substantially diametral apertures in the rod 187 and which are spaced along the length of such rod. To trap the edge portion of the membrane 3 in the groove formed between the rods 187, 188 and 189, the edge portion of the membrane is wrapped around a yieldable strip 191 which is received in such groove. Such strip may be of circular cross section and can be made of solid elastomer material. Bolts 190 can be tightened sufficiently to press rod 189 against the edge portion of the membrane and clamp tightly that portion encircling the strip 191. The structure of the membrane edge-attaching means shown in FIGURE 17 is similar to that of FIGURE 16. In this instance, however, the main rod member 187' is of tubular construction instead of being of solid structure like the rod 187 of FIGURE 16. Also, instead of the resilient strip around which the edge portion of the membrane is wrapped being solid, the strip 192 is hollow and, if desired, can be inflated as discussed above by supplying air under pressure or a liquid to its interior through a valve 57'.

The membrane used in the present invention should be substantially dimensionally stable, that is, it should not be appreciably stretchable. Various types of materials can be used for this purpose, but the membrane should be sufficiently strong to withstand during operation the stress to which it will be subjected by differential pressures on its opposite sides when the membrane is unsupported. At the same time, the membrane should not be sufficiently strong to withstand pressures appreciably in excess of those to which it may be subjected because to provide a membrane capable of withstanding much greater stress than would be required would increase the expense of such membrane considerably. Even in unloading material from the container the differential pressure across the membrane should not exceed 1½ pounds per square inch, which is sufficient to overcome the sliding friction that occurs.

Actually, it is possible to create a pressure differential on opposite sides of a membrane without supplying air under pressure to the space on either side of it. Such differential pressure may result from shifting of the load in the container of a tank car, such as shown in FIGURE 1, during transit because of the inertia of the discrete particle material. Such shifting may cause the membrane 3h to be moved away from lining relationship to a wall and if the differential pressure on such an unsupported section of membrane appreciably exceeds 1½ pounds per square inch, the membrane may be ruptured.

In order to avoid the possibility of a membrane 3h being subjected to substantial differential pressure when such differential pressure is not needed, such as during transit of a mobile container, the spaces at opposite sides of the membranes can be interconnected. Thus, a pipe 197 communicating with port 103 opening into the central portion of the container may be joined to pipes 198 communicating with connections 108 opening into the respective ends of the container. Communication through the pipes 198 can be controlled by valves 199. These valves could be closed when the container is being loaded or unloaded, during which operations a differential pressure is intentionally applied to the membranes 3h, but would be opened during transit of the tank car.

I claim:

1. In a container for receiving fluid or particle material, a membrane within the container, and means securing a portion of said membrane in sealing relationship to the wall of the container and including groove-forming means forming a groove receiving such portion of said membrane, retainer means obstructing the opening into such groove, a tube in such groove and an elongated flexible substantially incompressible member received within said tube and having a cross section which is smaller than the cross section of the tube hollow restraining movement of the portion of said membrane in such groove out through the obstructed opening of the groove.

2. In a container for receiving fluid or particle material, a membrane within the container, and means securing a portion of said membrane in sealing relationship to the wall of the container and including a first rod of circular cross section secured to the container wall, a second rod of circular cross section adjacent to said first rod, means connecting said two rods and operable to move said second rod toward said first rod for trapping a portion of said membrane between said two rods and the container wall, and means carried by said first rod and engageable by said second rod during movement thereof toward said first rod to urge said second rod toward the portion of said membrane between said second rod and the container wall.

References Cited

UNITED STATES PATENTS

| 1,669,183 | 5/1928 | Wilson | 220—85 |
| 2,578,090 | 11/1951 | Plummer | 220—85 |
| 2,912,004 | 10/1959 | Meredew | 222—386.5 X |
| 3,028,040 | 4/1962 | Woodward | 220—85 |
| 3,158,296 | 11/1964 | Cornelius | 222—386.5 |

FOREIGN PATENTS 702,518    1/1954    Great Britain.

GEORGE E. LOWRANCE, Primary Examiner

U.S. Cl. X.R.

220—46, 85; 222—386.5